(12) United States Patent
Bamba

(10) Patent No.: US 6,504,804 B1
(45) Date of Patent: Jan. 7, 2003

(54) MOVING BODY POSITION DETECTING METHOD AND DISC DRIVE APPARATUS

(75) Inventor: Mitsuyuki Bamba, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/497,565

(22) Filed: Feb. 3, 2000

(30) Foreign Application Priority Data

Feb. 8, 1999 (JP) .......................................... 11-030303

(51) Int. Cl.[7] ................................................. G11B 7/00
(52) U.S. Cl. ............................... 369/53.29; 369/44.28; 369/30.14; 369/30.17
(58) Field of Search ........................... 369/53.29, 44.28, 369/30.13, 30.17, 30.14

(56) References Cited

U.S. PATENT DOCUMENTS

| | | | |
|---|---|---|---|
| 5,654,945 A | * 8/1997 | Takenaka et al. | 369/32 |
| 5,682,362 A | * 10/1997 | Suzuki et al. | 369/32 |
| 5,926,447 A | * 7/1999 | Tomishima | 369/44.28 |
| 6,320,826 B1 | * 11/2001 | Willis et al. | 369/33 |
| 6,320,828 B1 | * 11/2001 | Sun | 369/44.28 |

* cited by examiner

Primary Examiner—W. R. Young
Assistant Examiner—Gautam R. Patel
(74) Attorney, Agent, or Firm—Oblon, Spivak, McClelland, Maier & Neustadt, P.C.

(57) ABSTRACT

A plurality of periodical signals are generated as the moving body moves. The periodical signals are given respective fundamental values. The fundamental value of one of the periodical signals that has a maximum value is detected sequentially. An extension value is generated in such a manner as to be incremented or decremented when the detected fundamental value changes from one unit repetition range to another. Position detection information of the moving body is constructed as a combination of the detected fundamental value and the extension value. The position detection information is stored.

8 Claims, 11 Drawing Sheets

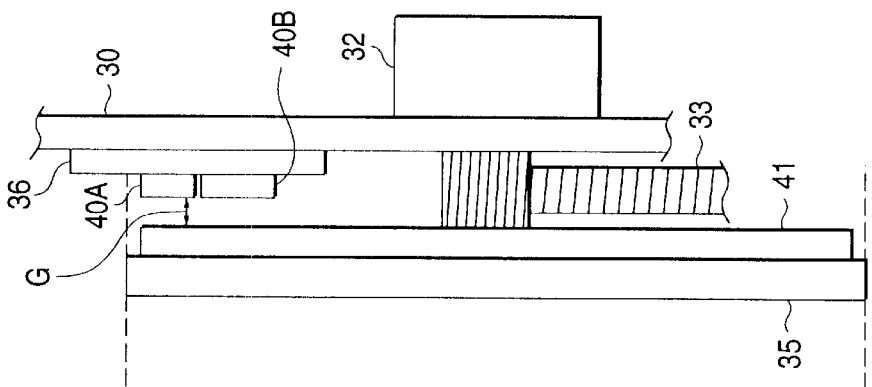
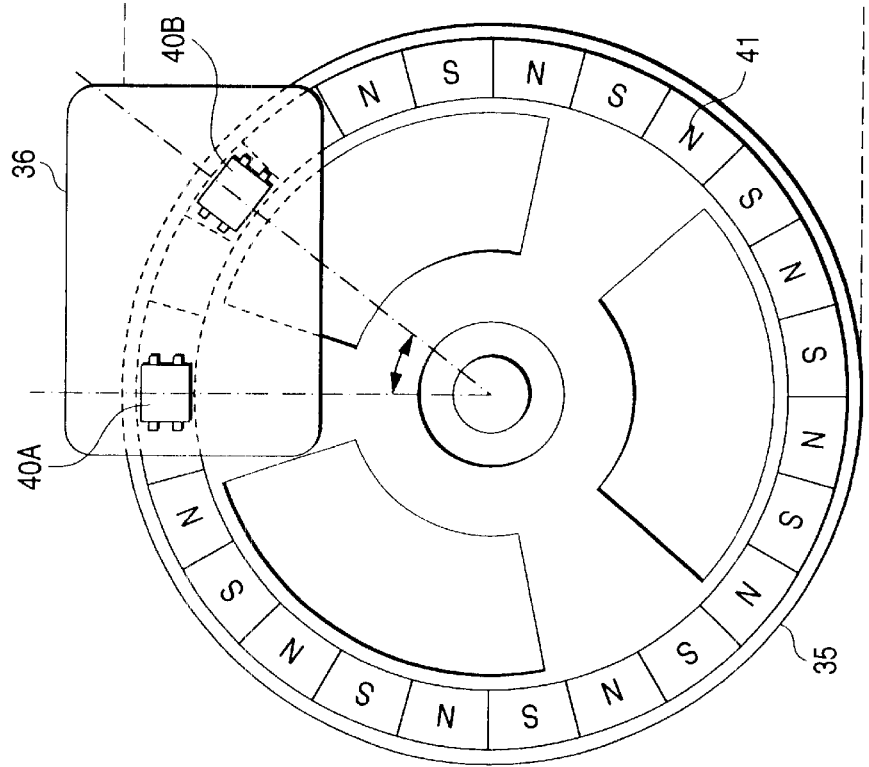

FIG. 8

| POSITION DETECTION INFORMATION ||
|---|---|
| EXTENSION VALUE | OUTPUT FUNDAMENTAL VALUE |
| 000000000b | 000b |
| 000000000b | 001b |
| 000000000b | 010b |
| 000000000b | 011b |
| 000000000b | 100b |
| 000000000b | 101b |
| 000000000b | 110b |
| 000000000b | 111b |
| 000000001b | 000b |
| 000000001b | 001b |
| 000000001b | 010b |
| 000000001b | 011b |
| 000000001b | 100b |
| 000000001b | 101b |
| 000000001b | 110b |
| 000000001b | 111b |
| 000000010b | 000b |
| 000000010b | 001b |
| ⋮ | ⋮ |

- S (first row)
- Sa (row with 000000001b / 000b)
- PHASE UNIT (first group)
- PHASE UNIT (second group)
- INSIDE ↑
- OUTSIDE ↓

*FIG. 10A*

| CHANGE OF OUTPUT FUNDAMENTAL VALUE | INCREMENT OR DECREMENT OF OUTPUT EXTENSION VALUE |
|---|---|
| x11b → x00b | +1 (OR -1) |
| x00b → x11b | -1 (OR +1) |

*FIG. 10B*

| CHANGE OF OUTPUT FUNDAMENTAL VALUE | INCREMENT OR DECREMENT OF OUTPUT EXTENSION VALUE |
|---|---|
| 111b → 000b | +1 (OR -1) |
| 111b → 001b | |
| 110b → 000b | |
| 000b → 111b | -1 (OR +1) |
| 001b → 111b | |
| 000b → 110b | |

*FIG. 10C*

| CHANGE OF OUTPUT FUNDAMENTAL VALUE | INCREMENT OR DECREMENT OF OUTPUT EXTENSION VALUE |
|---|---|
| 111b → 000b | +1 (OR -1) |
| 111b → 001b | |
| 110b → 000b | |
| 101b → 000b | |
| 110b → 001b | |
| 111b → 010b | |
| 000b → 111b | -1 (OR +1) |
| 001b → 111b | |
| 000b → 110b | |
| 000b → 101b | |
| 001b → 110b | |
| 010b → 111b | |

MOVING BODY POSITION DETECTING METHOD AND DISC DRIVE APPARATUS

BACKGROUND OF THE INVENTION

1. Field of the Invention

The present invention relates to a moving body position detecting method and disc drive apparatus.

2. Description of the Related Art

For example, in a disc drive apparatus capable of reproducing data from a disc such as a CD (compact disc) or a DVD (digital versatile disc), data readout, for example, is performed while control is so made that a desired position on the disc is accessed. In this case, control signals corresponding to a movement speed and a movement distance are generated and a rough movement of an optical unit as a data readout means from a current position to an access position is controlled based on those control signals.

The rough movement is an operation in which a pickup having a laser diode, a photodetector, an objective lens, etc. is moved in the radial direction of the disc by a sled mechanism. In the pickup rough movement control of the disc drive apparatus, position detection is performed based on a rotation operation of a sled motor.

For the pickup position detection, four signals, for example, that are close to a sinusoidal wave and correspond to a rotation operation of the sled motor are generated.

A signal having a maximum value among the four signals is detected. Further, when the maximum value signal has changed to another signal, a prescribed pulse indicating how the maximum value signal has changed is output to, for example, a control means that controls various operations of the disc drive apparatus and the pulse is inverted. Based on pulses received from the maximum value detecting means, the control means can count the number of times of changes of a maximum value signal. A movement distance of the pickup is detected based on this count value.

However, when, for example, noise is superimposed on a signal to be used for maximum value detection, erroneous counting may occur. In particular, when the movement speed of the pickup is low, signals that are compared with each other for maximum value detection vary slowly and hence noise is more easily superimposed thereon. As a result, in signal level comparison, an erroneous comparison result may occur due to influence of noise. Specifically, for a single changing point, two changing points may be detected erroneously due to counting of superimposed noise. Further, an error is added to pickup position detection information every time such erroneous counting occurs.

There may occur a case that the pickup cannot correctly be moved to a desired position when an error occurs in the position detection due to noise or the like.

Further, since only how the maximum value signal changes is detected and the pickup movement direction is not taken into consideration, erroneous counting may occur when the movement direction is reversed during a movement. For example, assume a case that when the pickup is being moved toward the disc outside, certain disturbance causes reversing of the movement direction and a changing point is counted. Since the change in movement direction cannot be detected from this counting operation, this counting operation is performed with a recognition that the pickup is still moving toward the disc outside.

As described above, conventionally, an error may occur in the pickup position detection due to influence of noise, disturbance, or the like, in which case the pickup may not correctly be moved to a desired position. Therefore, when the pickup is moved to a position distant from a desired position due to erroneous counting, the current position cannot be identified until address information or the like that is recorded on the disc surface is read out and checked. That is, to move the pickup to a desired position, it is necessary to move the pickup based on address information that is read out from the disc after moving it based on position detection information. This means execution of a wasteful operation and prevents reduction in power consumption.

SUMMARY OF THE INVENTION

The present invention has been made in view of the above circumstances in the art, and an object of the invention is therefore to increase the accuracy of detecting the position of an optical unit.

To attain the above object, the invention provides a method for detecting a position of a moving body, comprising the steps of generating a plurality of periodical signals as the moving body moves, the periodical signals being given respective fundamental values; sequentially detecting a fundamental value of one of the periodical signals that has a maximum value; generating an extension value in such a manner that the extension value is incremented or decremented when the detected fundamental value changes from one unit repetition range to another; constructing position detection information of the moving body as a combination of the detected fundamental value and the extension value; and storing the position detection information.

The invention also provides a disc drive apparatus comprising detecting means for sequentially detecting a fundamental value of one of a plurality of periodical signals that has a maximum value, the periodical signals being generated as a pickup moves that records and/or reads data on and/or from a mounted disc, the periodical signals being given respective fundamental values; storing means for storing position detection information of the pickup as a combination of the detected fundamental value and an extension value, the extension value being incremented or decremented when the detected fundamental value changes from one unit repetition range to another; and control means for controlling movement of the pickup based on the position detection information stored in the storing means.

The moving body position detecting method according to the invention makes it possible to obtain fine position detection information of a moving body by reducing influence of noise or the like that is superimposed on signals.

The disc drive apparatus according to the invention makes it possible to recognize the current position of the pickup in the disc radial direction based on position detection information that is obtained as the pickup moves. The movement control on the pickup can be performed efficiently based on such position detection information.

BRIEF DESCRIPTION OF THE DRAWINGS

FIGS. 3A and 3B are a front view and a side view, respectively, showing a positional relationship between a pulley and a sensor section;

FIG. 8 is a table showing how the extension value varies as the output fundamental value varies;

FIGS. 10A–10C show algorithms of increment or decrement of the extension value corresponding to a change of the output fundamental value.

DETAILED DESCRIPTION OF THE PREFERRED EMBODIMENT

A disc drive apparatus according to an embodiment of the present invention will be hereinafter described.

For example, an optical disc to be mounted in the disc drive apparatus according to the embodiment is a DVD (digital versatile disc) or a CD-type disc such as a CD-ROM. The invention can naturally be applied to disc drive apparatuses for other kinds of optical discs.

Figure 1:
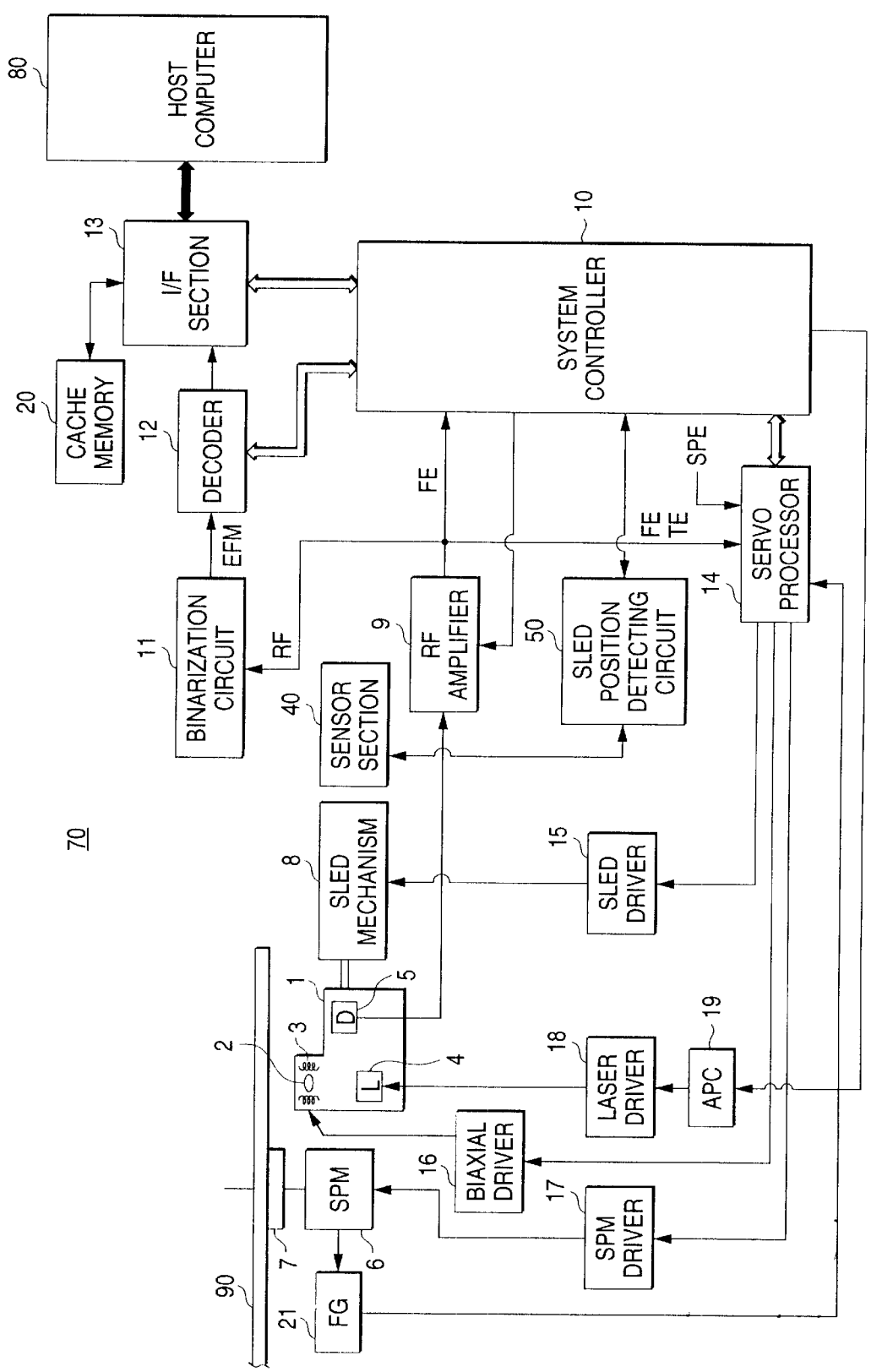
FIG. 1 is a block diagram of the main part of a disc drive apparatus according to an embodiment of the present invention.

FIG. 1 is a block diagram of the main part of the disc drive apparatus 70 according to the embodiment.

When a disc 90, on which data is recorded according to the CLV scheme, for example, is mounted in the disc drive apparatus 70, it is placed on a turn table 7. During a reproducing operation, the disc 90 is rotationally driven at a constant angular velocity (CAV) by a spindle motor 6. Data that is recorded on the disc 90 in the form of emboss pits or phase change pits is read out by a pickup 1. Although the embodiment is directed to the CAV scheme, the invention can also be applied to a case where a disc is rotationally driven according to the constant linear:velocity (CLV) scheme.

The pickup 1 incorporates a laser diode 4 as a laser light source, a photodetector 5 for detecting reflection light, an objective lens 2 as a laser light output end, and an optical system for applying laser light to the disc recording surface via the objective lens 2 and guiding resulting reflection light to the photodetector 5.

The objective lens 2 is held by a biaxial mechanism 3 so as to be movable in the tracking direction and the focusing direction.

The entire pickup 1 is made movable in the disc radial direction by as sled mechanism 8.

Reflection light information coming from the disc 90 is detected by the photodetector 5 and thereby converted into an electrical signal corresponding to a detected light amount. The electrical signal is supplied to an RF amplifier 9.

Having current-to-voltage conversion circuits, matrix operation/amplification circuits, etc. that correspond to output currents of a plurality of photodetecting elements as the photodetector 5, the RF amplifier 9 generates necessary signals through matrix operations. For example, the RF amplifier 9 generates an RF signal as reproduction data, a focusing error signal FE and a tracking error signal TE for servo controls, and other signals.

The reproduction RF signal that is output from the RF amplifier 9 is supplied to a binarization circuit 11. The focusing error signal FE and the tracking error signals TE are supplied to a servo processor 14.

The reproduction RF signal obtained by the RF amplifier 9 is binarized by the binarization circuit 11 into what is called an EFM signal (8-14 modulation signal (in the case of a CD)) or an EFM+ signal (8–16 modulation signal (in the case of a DVD), which is supplied to a decoder 12. The decoder 12 reproduces the information that has been read out from the disc 90 by performing EFM demodulation, error correction, etc. and, if necessary, CD-ROM decoding, MPEG decoding, or the like.

The decoder 12 accumulates EFM-demodulated data in a cache memory 20 as a data buffer and performs error correction etc. on the data stored in the cache memory 20. Buffering by use of the cache memory 20 is completed when error-corrected, proper reproduction data has been obtained.

Data being buffered by the cache memory 20 is read out and then transfer-output as a reproduction output from the disc drive apparatus 70.

An interface section 13, which is connected to an external host computer 80, exchanges reproduction data, a read command, etc. with the host computer 80. That is, reproduction data stored in the cache memory 20 is transfer-output to the host computer 80 via the interface section 13. A read command and other signals coming from the host computer 80 are supplied to a system controller 10 via the interface section 13.

The servo processor 14 performs servo operations by generating various servo drive signals, that is, focusing, tracking, sled, and spindle servo signals, based on a focusing error signal FE and a tracking error signal TE supplied from the RF amplifier 9, a spindle error signal SPE supplied from the decoder 12 or the system controller 10, and other signals.

Specifically, the servo processor 14 generates a focusing drive signal and a tracking drive signal in accordance with the focusing error signal FE and the tracking error signal TE and supplies those drive signals to a biaxial driver 16. The biaxial driver 16 drives a focusing coil and a tracking coil of the biaxial mechanism 3 in the pickup 1. In this manner, a tracking servo loop and a focusing servo loop are formed by the pickup 1, the RF amplifier 9, the servo processor 14, the biaxial driver 16, and the biaxial mechanism 3.

Further, the servo processor 14 supplies a spindle motor driver 17 with a spindle drive signal that is generated in accordance with the spindle error signal SPE. The spindle motor driver 17 applies, for example, a 3-phase drive signal to the spindle motor 6 in accordance with the spindle drive signal and thereby causes the spindle motor 6 to perform CAV rotation. In the case of the CAV scheme, the spindle error signal SPE can be obtained by comparing FG pulses (described later) with reference speed information.

The servo processor 14 also generates a spindle drive signal in accordance with a spindle kick/brake control signal supplied from the system controller 10 and thereby causes the spindle motor driver 17 to perform starting, stopping, or the like of the spindle motor 6.

The rotation speed of the spindle motor 6 can be set at a fast speed such as an nx2-fold speed, an nx4-fold speed, and an nx8-fold speed, where an n-fold speed is an ordinary speed. Such speed setting is realized by the system controller 10's variably setting the reference speed information that is to be compared with the spindle error signal SPE.

An FG 21 generates FG pulses at a frequency corresponding to the rotation speed of the spindle motor 6 and supplies the FG pulses to the servo processor 14. For example, the FG 21 generates six FG pulses per one rotation of the spindle motor 6.

As for the CLV rotation of the spindle motor 6, the system controller 10 can set the linear velocity at any of various speeds. This will be described below.

For use in decoding, the decoder 12 generates a reproduction clock signal that is synchronized with an EFM signal. For example, current rotation speed information can be obtained from this reproduction clock signal. The system controller 10 or the decoder 12 generates a spindle error signal SPE for CLV servo by comparing the current rotation speed information with the reference speed information. Therefore, the system controller 10 can vary the linear velocity of CLV rotation by switching the value as the reference speed information. For example, a linear velocity that is, for example, four or eight times faster than an ordinary linear velocity can be realized. This makes it possible to increase the data transfer rate.

The servo processor 14 generates a sled drive signal based on a sled error signal that is obtained as, for example, a low-frequency component of the tracking error signal TE, an access execution control of the system controller 10, or the like, and supplies the generated sled drive signal to a sled driver 15. The sled driver 15 drives the sled mechanism 8 in accordance with the sled drive signal. For example, the sled mechanism 8 has a mechanism including a main shaft for holding the pickup 1, a sled motor, and transmission gears. A desired slide movement of the pickup 1 is performed as the sled driver 15 drives the sled motor in accordance with the sled drive signal.

As described later in detail, a pulley having a magnet is provided to detect a rotation operation of the sled motor. A sensor section 40 consisting of, for example, two hall elements that are so disposed as to have a prescribed gap with respect to the magnet detects the poles of the magnet. Two signals detected by the sensor section 40 are supplied to a sled position detecting section 50. The sled position detecting section 50 generates, for example, six signals based on the two signals supplied from the sensor section 40, and generates, based on those eight signals in total, position detection information of the pickup 1 in association with a rotation operation of the pulley, that is, an operation of the sled motor. The position detection information is supplied to the system controller 10.

The laser light emission of the laser diode 4 in the pickup 1 is driven by a laser driver 18.

In performing a reproducing operation on the disc 90, the system controller 10 sets a laser power control value in an automatic power control circuit 19. The automatic power control circuit 19 controls the laser driver 18 so that laser light is output in accordance with the laser power control value thus set.

The above-described various operations such as the servo controls, decoding, and encoding are controlled by the system controller 10 that is a microcomputer.

The system controller 10 performs various operations in response to a command that is supplied from the host computer 80.

For example, when receiving, from the host computer 80, a read command that requests transfer of certain data recorded on the disc 90, first the system controller 10 performs a seek control with a designated address as a target. Specifically, the system controller 10 issues a command to the servo processor 14 to has it perform an access operation of the pickup 1 with the address that is designated by the seek command employed as a target.

Then, the system controller 10 performs operation controls that are necessary to transfer data of the designated data section to the host computer 80. Specifically, the system controller 10 transfers the request data by performing data readout from the disc 90, decoding, buffering, etc.

The read command (transfer request) supplied from the host computer 80 includes a request start address that is the first address of a request data section and a request data length indicating a section length starting from the first address.

For example, a transfer request having a request start address of N and a request data length of 3 means a transfer request of data that consists of three sectors, that is, sectors having LBA "N" to LBA "N+2." LBA means a logical block address, that is, an address given to each data sector of the disc 90.

Figure 2:
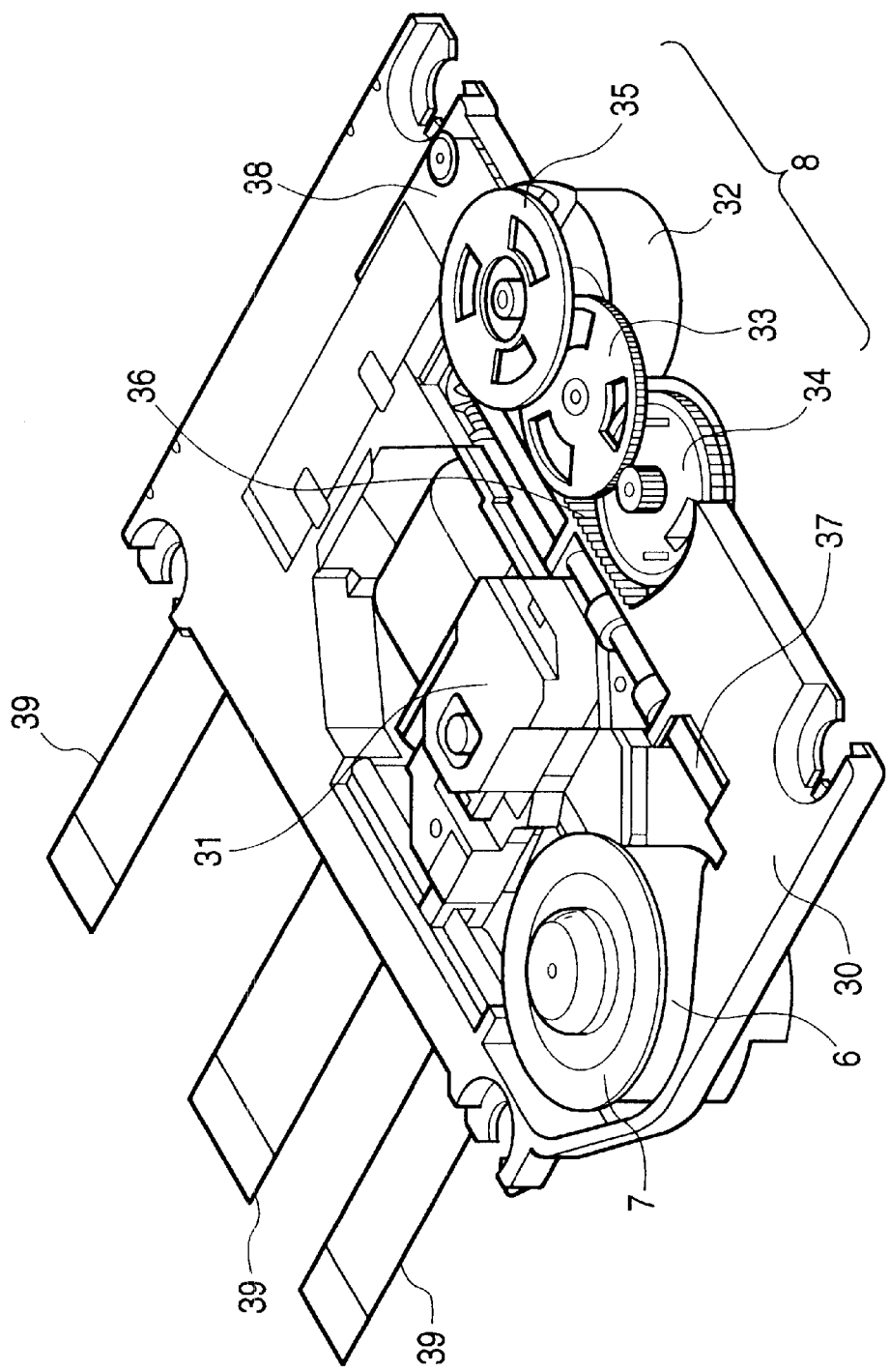
FIG. 2 is a perspective view showing an example structure of a sub-chassis that is mounted in the disc drive apparatus according to the embodiment.

FIG. 2 is a perspective view of a mechanism in the vicinity of the pickup 1 and the sled mechanism 8. The components in FIG. 2 having corresponding components in FIG. 1 are given the same reference numerals as the latter.

An optical unit 31 having the pickup 1, the spindle motor 6, the turn table 7, the sled mechanism 8, etc. are mounted on a sub-chassis 30. The sub-chassis 30 in the state shown in FIG. 2 is mounted in the disc drive apparatus and connected to circuit boards in a chassis of the disc drive apparatus via flexible circuit boards 39 etc.

In the chassis of the disc drive apparatus, the optical unit 31 is slidably attached to a main shaft 37 that extends in the radial direction of the disc 90, whereby the optical unit 31 can be moved by the sled mechanism 8 along the main shaft 37. In the following description, the pickup 1 will also be called the optical unit 31.

The sled mechanism 8 is composed of a sled motor 32, an intermediate gear 33, a limiter gear 34, a pulley 35, etc. The sled motor 32 is rotated in a prescribed direction in accordance with a drive signal that is generated by the sled driver 15 based on a control signal supplied from the system controller 10 shown in FIG. 1. Although not shown in FIG. 2, a small-diameter gear, for example, is attached to the rotary shaft of the sled motor 32 so as to transmit motive power to the intermediate gear 33. The intermediate gear 33 is so configured as to transmit motive power to the limiter gear 34. Therefore, the limiter gear 34 is rotated as the sled motor 32 rotates.

The limiter gear 34 is in mesh with a rack gear 36 that is formed on the optical unit 31. As the limiter gear 34 rotates, the optical unit 31 is moved along the main shaft 37.

As described above, the optical unit 31 can be moved in the radial direction of the disc 90 along the main shaft 37 as the sled motor 32 rotates.

The pulley 35, which is attached to the rotary shaft of the sled motor 32, is rotated as the sled motor 32 rotates. That is, the movement of the optical unit 31 corresponds to the rotation of the pulley 35. As described later, the non-illustrated surface of the pulley 35 is formed with a pulley magnet (magnet plate) having a prescribed magnetization pattern (Ss and Ns).

A sensor board 38, which is provided on the sub-chassis 30, is provided with sensors 40A and 40B at such positions as to be opposed to the pulley magnet. That is, as the pulley 35 rotates, the magnetization pattern of the pulley magnet goes by the sensors 40A and 40B. Therefore, signals having waveforms that correspond to the rotation of the pulley 35 are obtained from the sensors 40A and 40B.

FIGS. 3A and 3B show a positional relationship between the pulley magnet 41 provided on the pulley 35 and the sensors 40A and 40B that are provided on the sensor board 38. FIG. 3A is a front view and FIG. 3B is a side view. Although actually the pulley magnet 41 and the sensors 40A and 40B are opposed to each other as shown in FIG. 3B, for the sake of convenience of description not only the pulley magnet 41 but also the sensors 40A and 40B are shown in FIG. 3A.

The pulley magnet 41 is formed along the periphery of the pulley 35, and a magnetization pattern indicated by "N", and "S" is written in the pulley magnet 41 in the manner shown in FIG. 3A. The sensors 40A and 40B are so disposed on the sensor board 38 that signals deviating from each other by 90° in phase are obtained as the pulley 35 (i.e., the pulley magnet 41) rotates.

Figure 4:
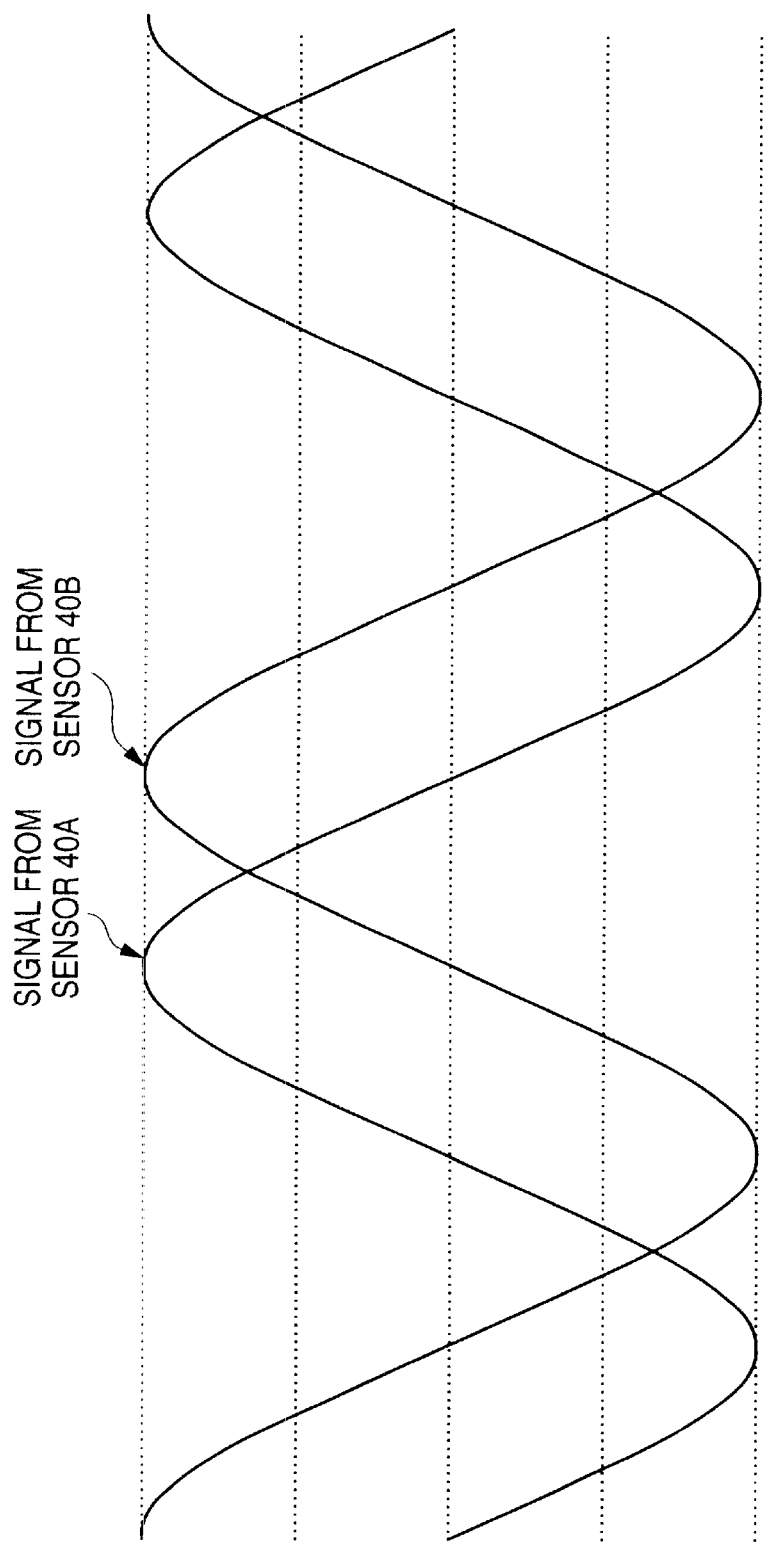
FIG. 4 schematically shows waveforms of signals that are detected by sensors provided in the sensor section.

Therefore, when the sled motor 32 is rotated, the optical unit 31 is moved and the sensors 40A and 40B read out the magnetization pattern of the pulley magnet 41. If the sled motor 32 is rotated so as to move the optical unit 31 in the same direction at a constant speed, signals having waveforms as shown in FIG. 4, for example, can be obtained. In the following description, signals obtained from the sensors 40A and 40B will be called sensor signals A and B, respectively. Signals obtained from the sensors 40A and 40B in the above manner as the optical unit 31 moves are supplied from the sensor section 40 to the sled position detecting section 50 along the route shown in FIG. 1. Eight signals are generated based on those two signals and the position of the optical unit 31 is detected by detecting how the signal having a maximum value among the eight signals changes.

Figure 5:
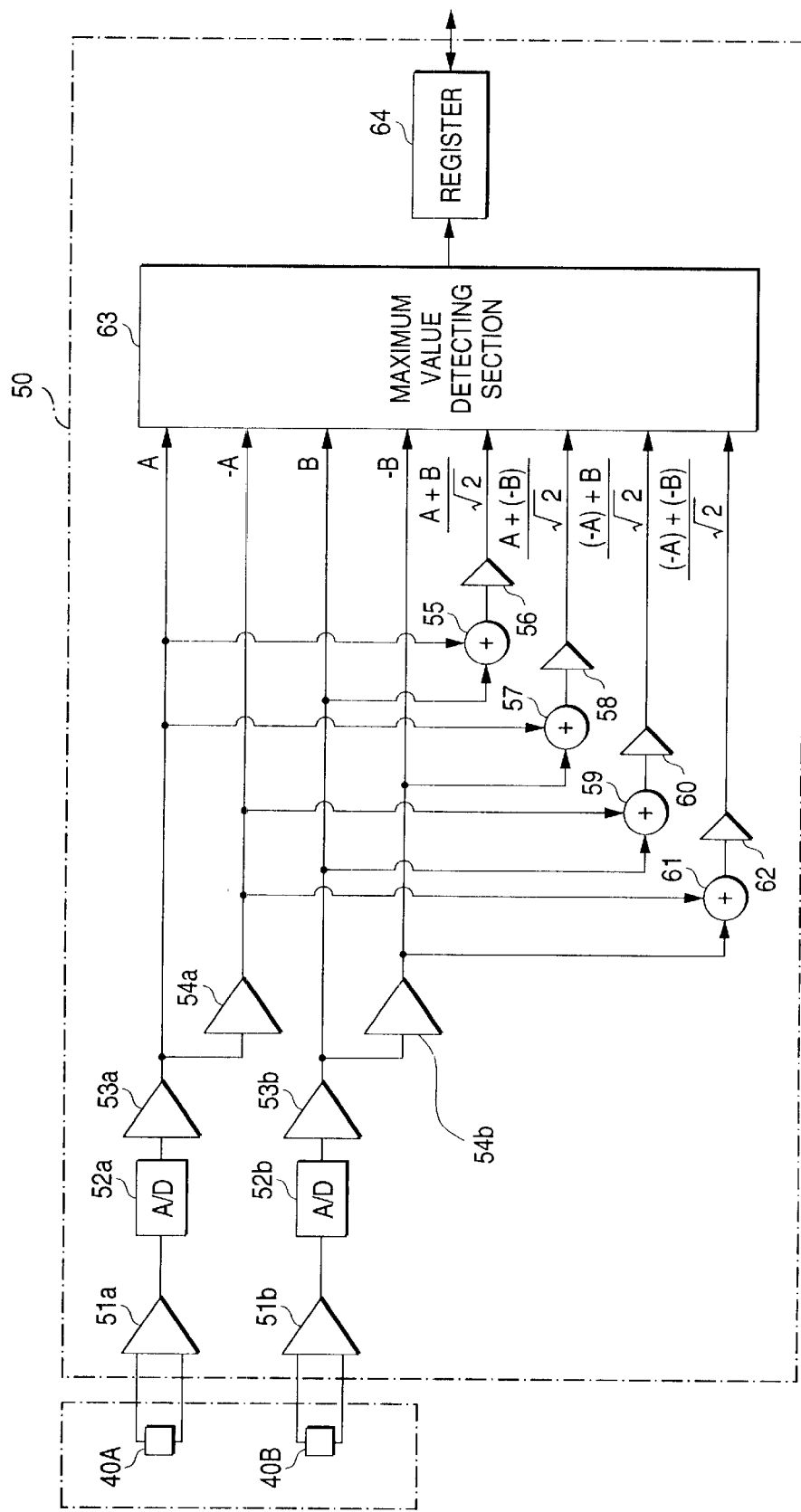
FIG. 5 shows an example configuration of a sled position detecting section.

Next, an example configuration of the sled position detecting section 50 will be described with reference to FIG. 5.

First, the sensor signal A that is obtained from the sensor 40A is amplified by an amplifier 51a and then converted into a digital signal by an A/D conversion section 52a. The digital signal is subjected to a gain adjustment by a gain adjustment section 53a, whereby a signal A is formed. The gain-adjusted signal is multiplied by "−1" by a −1 multiplication section 54a and thereby converted into a signal −A having a prescribed voltage level.

The sensor signal B that is obtained from the sensor 40B is amplified by an amplifier 51b and then converted into a digital signal by an A/D conversion section 52b. The digital signal is subjected to a gain adjustment by a gain adjustment section 53b, whereby a signal B is formed. The gain-adjusted signal is multiplied by "−1" by a −1 multiplication section 54b and thereby converted into a signal −B having a prescribed voltage level.

The signals A and B are given levels corresponding to the waveforms of the sensor signals. A and B shown in FIG. 3, respectively.

The signals A and B are supplied to adders 55, 57, 59, and 61. The signals A and B are added together by the adder 55 and a sum signal is multiplied by $1/\sqrt{2}$ by a $1/\sqrt{2}$ section 56, whereby a signal $(A+B)/\sqrt{2}$ is obtained.

The signals A and −B are added together by the adder 57 and a sum signal is multiplied by $1/\sqrt{2}$ by a $1/\sqrt{2}$ section 58, whereby a signal $(A+(-B))/\sqrt{2}$ is obtained.

The signals −A and B are added together by the adder 59 and a sum signal is multiplied by $1/\sqrt{2}$ by a $1/\sqrt{2}$ section 60, whereby a signal $((-A)+B)/\sqrt{2}$ is obtained.

The signals −A and −B are added together by the adder 61 and a sum signal is multiplied by $1/\sqrt{2}$ by a $1/\sqrt{2}$ section 62, whereby a signal $((-A)+(-B))\sqrt{2}$ is obtained.

The eight signals A, B, −A, −B, $(A+B)/\sqrt{2}$, $(A+(-B))/\sqrt{2}$, $((-A)+B)/\sqrt{2}$, and $((-A)+(-B))/\sqrt{2}$ that have been generated in the above manner based on the sensor signals A and B are supplied to a maximum value detecting section 63. The maximum value detecting section 63 detects the maximum value among the values of the eight signals and stores data corresponding to the signal having the maximum value in a register 64.

Figure 6:
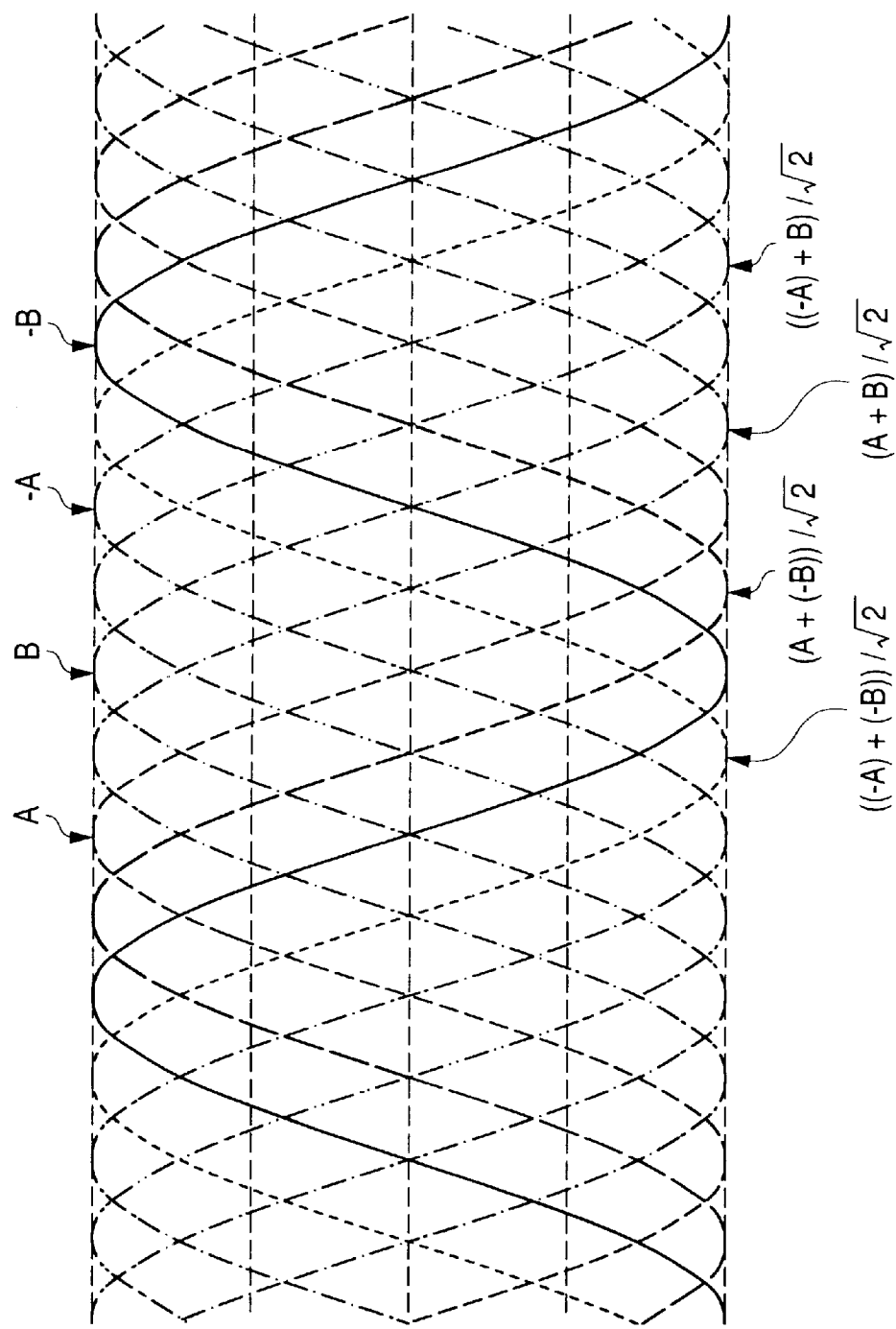
FIG. 6 schematically shows waveforms of signals that are generated in the sled position detecting section.

For example, the eight signals generated in the sled position detecting section 50 are as shown in FIG. 6. These signals have waveforms that are based on the sensor signals A and B. Since the phases of the sensor signals A and B deviate from each other by 90°, the eight signals are sinusoidal waves that deviate from each other by 45° in phase. The levels of the eight signals vary as the sled motor 32 is driven and the optical unit 31 is thereby moved toward the inside periphery or the outside periphery of the disc 90.

As described above, the eight signals that deviate from each other in phase are supplied to the maximum value detecting section 63. Each signal can be represented by 3-bit data.

Figure 7:
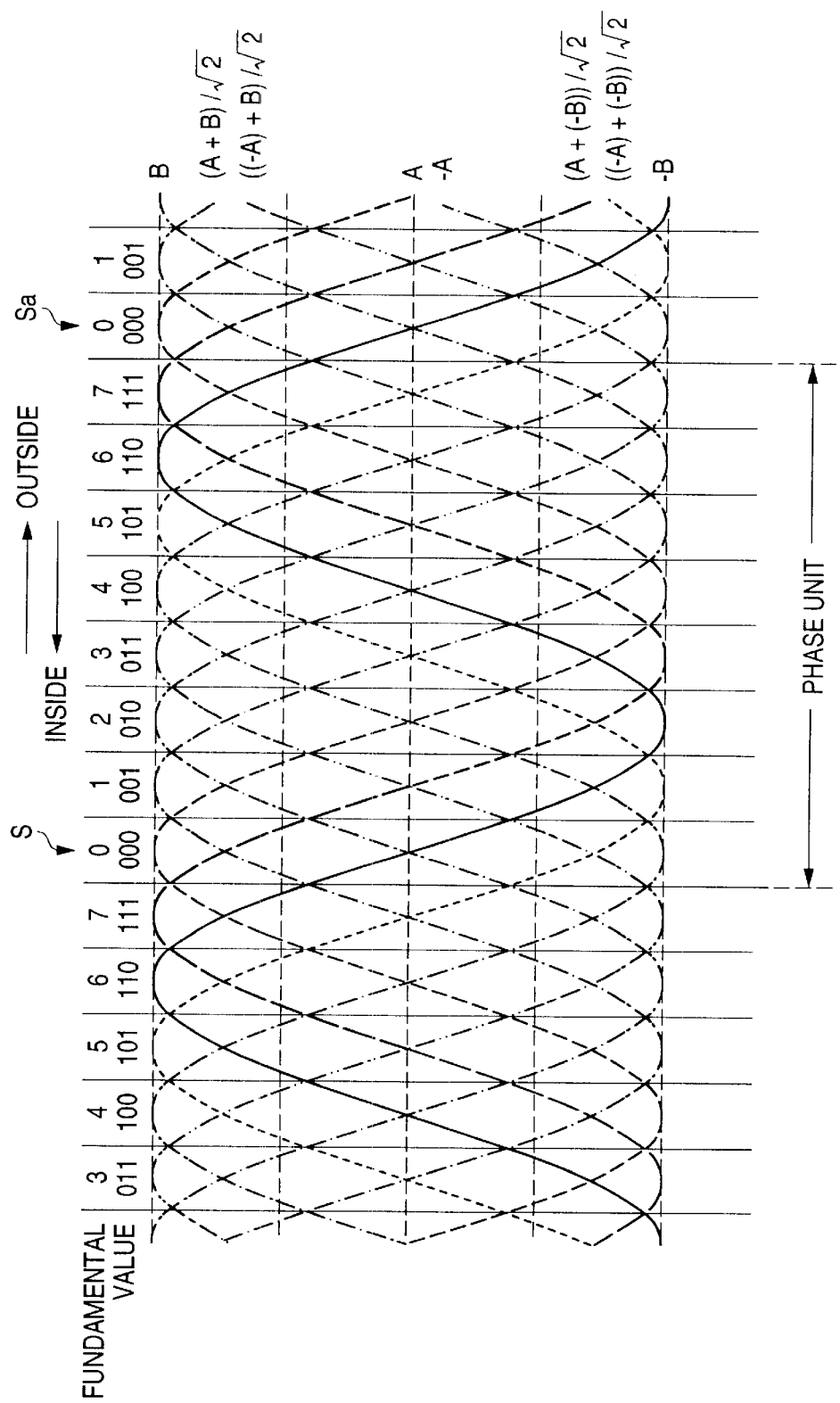
FIG. 7 shows fundamental values corresponding to respective signals generated in the sled position detecting section.

That is, the eight signals shown in FIG. 6 are represented by 3 bits in a manner shown in FIG. 7. In FIG. 7, the rightward direction corresponds to transitions toward the outside periphery of the disc 90 and the leftward direction corresponds to transitions toward the inside periphery of the disc 90.

In the example of FIG. 7, the signals correspond to the following values:

|  | Binary | Decimal |
| --- | --- | --- |
| A | 000b | 0 |
| $(A + B)/\sqrt{2}$ | 001b | 1 |
| B | 010b | 2 |
| $((-A) + B)/\sqrt{2}$ | 011b | 3 |
| −A | 100b | 4 |
| $((-A) + (-B))/\sqrt{2}$ | 101b | 5 |
| −B | 110b | 6 |
| $(A + (-B))/\sqrt{2}$ | 111b | 7 |

In the following description, a binary number is expressed by adding "b" to the number at the end. In this example, numbers "0" to "7" (decimal notation) are repeated and the unit range of repetition will be called a "phase unit."

For example, assume a case that the optical unit 31 is moved outward starting from point S shown in FIG. 7. In this case, the signal corresponding to the maximum value detected by the maximum value detecting section 63 varies in order of $(A+B)/\sqrt{2}$, B, $((-A)+B)/\sqrt{2}$, ..., and the value corresponding such a signal is incremented like 1, 2, 3, .... Assume another case that the optical unit 31 is moved inward starting from point S shown in FIG. 7. In this case, the signal corresponding to the maximum value detected by the maximum value detecting section 63 varies in order of $((-A)+(-B))/\sqrt{2}$, −B, $(A+(-B))/\sqrt{2}$, ..., and the value corresponding such a signal is decremented like 7, 6, 5, .... That is, receiving the eight signals, the maximum value detecting section 63 detects a signal having a maximum value among those signals and outputs a 3-bit value corresponding to that signal to the register 64. Therefore, the value that is supplied from the maximum value detecting section 63 to the register 64 varies as the optical unit 31 moves. In the following description, the 3-bit values corresponding to the respective signals will be called fundamental values.

In this embodiment, an extension value of 9 bits, for example, is set for the output fundamental value. When switching is made from one phase unit to another as the optical unit 31 moves and the fundamental value corresponding to the maximum value signal varies, the extension value is incremented or decremented.

FIG. 8 shows a corresponding relationship between the output fundamental value and the extension value. In FIG. 8, point S is set as the initial position of the optical unit 31 and an extension value has such a value as "000000000b."

In the example of FIG. 7, if the optical unit 31 is moved outward starting from point S, the output fundamental value varies corresponding to the maximum value signal and the extension value is incremented to "000000001b" when the optical unit 31 reaches point Sa and hence the phase unit is switched. If the optical unit 31 is moved inward starting from point Sa, the extension value is decremented to "000000000b" when the output fundamental value is changed from "0" to "7", and hence the phase unit is switched. That is, the extension value is incremented when the phase unit is. switched as a result of increment of the output fundamental value. Conversely, the extension value is decremented when the phase unit is switched as a result of decrement of the output fundamental value. Therefore, the position detection information can finely represent the position of the optical unit 31 in the radial direction of the disc 90 in the form of 12-bit data.

Figure 9:
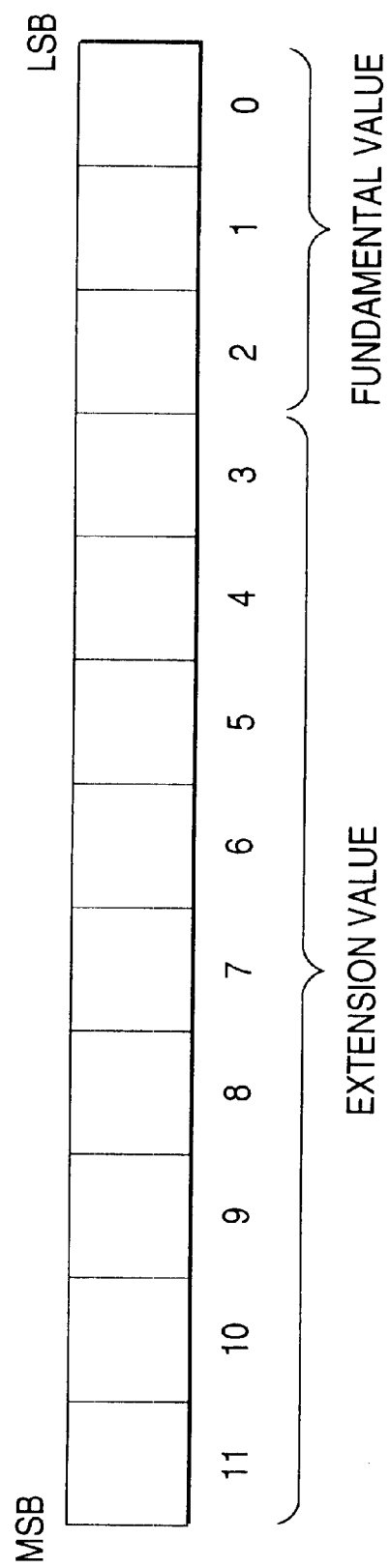
FIG. 9 shows an example structure of a register in the sled position detecting section.

For example, the register 64, which stores position detection information (a fundamental value and an extension value) that is output from the maximum value detection section 63, is configured as shown in FIG. 9.

In this embodiment, the register 64 is so configured as to store 12-bit data, for example. The lower 3 bits are a fundamental value area where to store a fundamental value and the upper 9 bits are an extension value area where to store an extension value.

The system controller 10 shown in FIG. 1 can recognize, approximately correctly, the position of the optical unit 31 by referring to the position detection information stored in the register 64. The system controller 10 refers to the position detection information in the register 64 in, for example, interrupt processing when detecting a change of the position detection information. Alternatively, the system controller 10 may refer to the register 64 at arbitrary time points.

Incidentally, when the phase unit is to be switched as a result of a round variation of the output fundamental value, for example, when the output fundamental value is to change from "7" (current phase unit) to "0" (next phase unit), noise or the like may cause an event that the output fundamental value changes from "7" to "1" skipping "0." It is possible to cope with such an event by using an algorithm that enables, even when the output fundamental value has changed from "7" to "1," a judgment that the output fundamental value has made a round variation.

FIGS. 10A–10C show examples of such an algorithm and show how the extension value is incremented or decremented when the output fundamental value changes. In FIGS. 10A–10C, the output fundamental value is expressed by the binary notation and "x" indicates that the bit may be either of "1" and "0."

For example, FIG. 10A shows a relatively simple example in which the output extension value is incremented or decremented when the last two bits of the output fundamental value increase or decrease by one.

FIG. 10B shows an example in which the extension value is incremented when the output fundamental value makes such a change as "7" to "0," "7" to "1," or "6" to "0" and it is decremented when the output fundamental value makes such a change as "0" to "7," "1" to "7," or "0" to "6."

FIG. 10C shows a more complex example in which the extension value is incremented also when the output fundamental value makes such a change as "5" to "0," "6" to "1," or "7" to "2" and it is decremented also when the output fundamental value makes such a change as "0" to "5," "1" to "6," or "2" to "7."

As indicated by parentheses, the extension value may be decremented in a case where it is incremented in the above description, and vice versa.

By preparing the above kind of algorithm in the system controller 10, a judgment that the phase unit has been switched can be made even if noise or the like has caused the output fundamental value to change in a non-consecutive manner. This makes it possible to prevent a trouble in the detection of the position of the optical unit 31.

Next, initialization of the extension value will be described.

The output fundamental value varies as the optical unit 31 is moved. The extension value, which varies with the output fundamental value, needs to be initialized at a certain position. An example in which the innermost position or the outermost position of the disc 90 is employed as the initialization position will be described.

For example, when a disc 90 is mounted in the disc drive apparatus, the optical unit 31 is moved to the innermost position of the disc 90. For example, a means for judging whether the optical unit 31 has moved to the innermost or outermost position may be such that the means judges that the optical unit 31 has reached the innermost or outermost position when the optical unit 31 has not moved for a prescribed period. Alternatively, whether the optical unit 31 has reached the innermost or outermost position may be judged by disposing a detection switch at a proper position in the sub-chassis 30 and causing the switch to operate when the optical unit 31 reaches the innermost or outermost position.

By initializing the extension value at a certain position on the disc 90, the register 64 is so configured that phase units can be formed with a sufficient margin for the movement range of the optical unit 31, whereby the position of the optical unit 31 in the radial direction of the disc 90 can be identified over its entire movement range. In this embodiment, since extension values are expressed by 9 bits, positions of –2,048 to 2,047 can be expressed according to the 2's complement notation.

Figure 11:
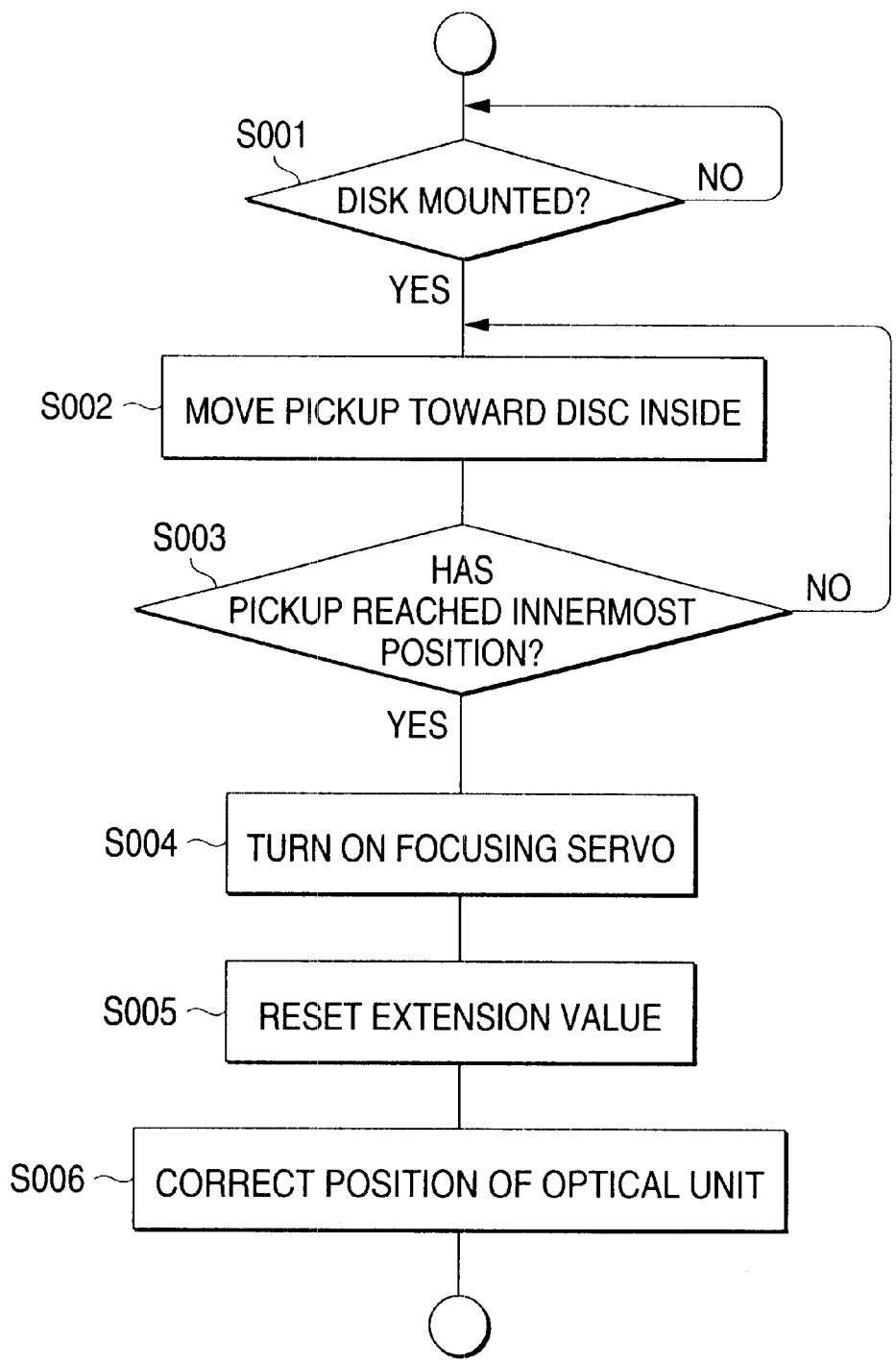
FIG. 11 is a flowchart showing a process of correcting the position of an optical unit based on position detection information.

FIG. 11 is a flowchart showing an example process that is executed by the system controller 10 when positioning between the optical unit 31 and the disc 90 is performed with initialization of the extension value. Although this flowchart is directed to the case where the innermost position is employed as the initial position, a similar process is executed in a case where the outermost position is employed as the initial position.

First, it is judged at step S001 whether a disc 90 has been mounted. If it is detected that a disc 90 has been mounted, at step S002 the system controller 10 performs a control for moving the optical unit 31 toward the inside periphery of the disc 90. At step S003, the system controller 10 judges whether the optical unit 31 has reached the innermost position of the disc 90. If it is judged that the optical unit 31 has reached the innermost position of the disc 90, the system controller 10 turns on the focusing servo at step S004 and resets the extension value at step S005. At step S006, the system controller 10 reads out address information from the disc 90 and corrects the position of the optical unit 31 with respect to the disc 90.

Thereafter, the extension value is incremented or decremented as the optical unit 31 moves. Since the extension value corresponds to the address information on the disc 90, as described above the position of the optical unit 31 can be identified over its entire movement range.

The method for coping with noise by using, for example, any of the algorithms shown in FIGS. 10A–10C was described above. However, when noise is extremely large, the amount of a skip of the output fundamental value becomes unduly large. For example, if the output fundamental value makes a large skip such as from "100b" to "000b" or from "000b" to "100b," it is difficult to recognize whether the skip occurred toward the outside periphery or the inside periphery. When a skip of an amount that is larger than a prescribed amount has occurred, this event may be stored as an error and thereafter correction of the output fundamental value may be performed at a proper time point in which an extension value reset operation as described above by using the flowchart of FIG. 11 is performed.

An alternative method may be employed in which address information is read out from the disc 90 when an error is recognized and the positional correction between the optical unit 31 and the disc 90 is performed based on the read-out address information.

For example, an error may be recognized in such a manner that by using the algorithm of FIG. 10C, for example, a judgment that an error has occurred is made when the output fundamental value makes any of the following changes:

100b→000b, 101b→001b

110b→010b, 111b→011b

000b→100b, 001b→101b

010b→110b, 011b→111b

The above examples are such that the output fundamental value makes a skip of 3 or more and the phase unit is thereby switched. In each of the above examples, it is difficult to judge the skip direction. Therefore, when such a change of the output fundamental value is detected, a reset operation or the like is performed to determine the current position again, whereby thereafter the position of the optical unit 31 can be detected accurately.

Although the above embodiment is directed to the case where the position of the optical unit 31 is detected by using eight signals, the number of signals that are generated in the sled position detecting section 50 may be increased when it is necessary to increase the accuracy of the position detection.

What is claimed is:

1. A method for detecting a position of a moving body, comprising the steps of:

generating a plurality of periodical signals as the moving body moves, the periodical signals being given respective fundamental values;

sequentially detecting a fundamental value of one of the periodical signals that has a maximum value;

generating an extension value in such a manner that the extension value is incremented or decremented when the detected fundamental value changes from one unit repetition range to another;

constructing position detection information of the moving body as a combination of the detected fundamental value and the extension value; and storing the position detection information.

2. The method according to claim 1, wherein when the detected fundamental value has made a change from one unit repetition range to another but has not changed to an expected value, the extension value is incremented or decremented based on a relationship between detected fundamental values before and after the change.

3. The method according to claim 1, wherein the number of figures of the extension value is greater than that of the fundamental values.

4. The method according to claim 1, further comprising the step of resetting the extension value when the moving body is located at a prescribed position.

5. A disc drive apparatus comprising:

detecting means for sequentially detecting a fundamental value of one of a plurality of periodical signals that has a maximum value, the periodical signals being generated as a pickup moves that records and/or reads data on and/or from a mounted disc, the periodical signals being given respective fundamental values;

storing means for storing position detection information of the pickup as a combination of the detected fundamental value and an extension value, being incremented or decremented when the detected fundamental value changes from one unit repetition range to another; and control means for controlling movement of the pickup based on the position detection information stored in the storing means.

6. The disc drive apparatus according to claim 5, wherein the control means corrects a position of the pickup based on the position detection information and address information that is read out from the disc.

7. The disc drive apparatus according to claim 5, wherein the control means resets the extension value when the pickup is located at an innermost position or an outermost position of the disc.

8. The disc drive apparatus according to claim 5, further comprising incrementing and decrementing means for incrementing or decrementing, when the detected fundamental value has made a change from one unit repetition range to another but has not changed to an expected value, the extension value based on a relationship between two detected fundamental values before and after the change.

\* \* \* \* \*